US006906981B2

United States Patent
Vaage

(10) Patent No.: US 6,906,981 B2
(45) Date of Patent: Jun. 14, 2005

(54) METHOD AND SYSTEM FOR ACQUIRING MARINE SEISMIC DATA USING MULTIPLE SEISMIC SOURCES

(75) Inventor: Svein Torleif Vaage, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 254 days.

(21) Appl. No.: 10/197,235

(22) Filed: Jul. 17, 2002

(65) Prior Publication Data

US 2004/0013037 A1 Jan. 22, 2004

(51) Int. Cl.$^7$ .............................. G01V 1/38; H04R 1/02
(52) U.S. Cl. ............................ 367/21; 367/20; 367/23; 367/57; 702/14; 181/110
(58) Field of Search ................ 702/14; 367/23, 367/53, 56, 57, 20–21, 59, 142; 181/110, 111

(56) References Cited

U.S. PATENT DOCUMENTS

| | | | | |
|---|---|---|---|---|
| 3,351,899 A | * | 11/1967 | Luhrmann et al. | 367/142 |
| 4,300,653 A | * | 11/1981 | Cao et al. | 181/111 |
| 4,800,538 A | * | 1/1989 | Passmore et al. | 367/55 |
| 4,953,657 A | | 9/1990 | Edington | |
| 4,955,952 A | * | 9/1990 | Williams et al. | 181/111 |
| 5,184,329 A | * | 2/1993 | Regnault et al. | 367/23 |
| 5,281,773 A | * | 1/1994 | Duren | 181/111 |
| 5,724,306 A | | 3/1998 | Barr | |
| 5,781,503 A | | 7/1998 | Kim | |
| 5,793,702 A | | 8/1998 | Paffenholz | |
| 5,924,049 A | | 7/1999 | Beasley et al. | |
| 5,940,788 A | | 8/1999 | Morman et al. | |
| 6,021,379 A | | 2/2000 | Duren et al. | |
| 6,151,556 A | | 11/2000 | Allen | |
| 6,178,381 B1 | | 1/2001 | Padhi et al. | |
| 6,208,587 B1 | | 3/2001 | Martin | |
| 6,314,371 B1 | | 11/2001 | Monk | |
| 6,317,384 B1 | | 11/2001 | Luo et al. | |
| 6,317,695 B1 | | 11/2001 | Zhou et al. | |
| 6,381,544 B1 | | 4/2002 | Sallas et al. | |

* cited by examiner

Primary Examiner—Nelson Moskowitz
(74) Attorney, Agent, or Firm—E. Eugene Thigpen; Richard A. Fagin

(57) ABSTRACT

A method for seismic surveying is disclosed which includes towing a first seismic energy source and at least one seismic sensor system. A second seismic energy source is towed at a selected distance from the first source. The first seismic energy source and the second seismic energy source are actuated in a plurality of firing sequences. Each of the firing sequences includes firing of the first source, waiting a selected time firing the second source and recording signals generated by the seismic sensor system. The selected time between firing the first source and the second source is varied between successive ones of the firing sequences. The firing times of the first and second source are indexed so as to enable separate identification of seismic events originating from the first source and seismic events originating from the second source in detected seismic signals.

38 Claims, 14 Drawing Sheets

FIG 2   RAY PATHS FOR SOURCE
TOWED BY SEISMIC VESSEL

FIG 3   RAY PATHS FOR SOURCE
TOWED BY SOURCE VESSEL

| SOURCE | FIRING TIME |
|--------|-------------|
| A | 0 |
| B | 0.1 SEC |

| SOURCE | FIRING TIME |
|---|---|
| A | 0 |
| B | 0.3 SEC |

| SOURCE | FIRING TIME |
|---|---|
| A | 0 |
| B | 0.4 SEC |

| SOURCE | FIRING TIME |
|--------|-------------|
| A | 0 |
| B | 0.2 SEC |

| SOURCE | FIRING TIME |
|---|---|
| A | 0 |
| B | 0.5 SEC |

| SOURCE | FIRING TIME & DELAY |
|---|---|
| A | 0.4 SEC |
| B | 0.1 |

| SOURCE | FIRING TIME & DELAY |
|---|---|
| A | 0.2 SEC |
| B | 0.5 |

| SOURCE | FIRING TIME & DELAY |
|--------|---------------------|
| A | 0.1 SEC |
| B | 0.5 |

| SOURCE | FIRING TIME & DELAY |
|---|---|
| A | 0.3 SEC |
| B | 0.5 |

| SOURCE | FIRING TIME & DELAY |
|---|---|
| A | 0 |
| B | 0.5 SEC |

|  | $S_A$ | $S_B$ | $C_N$ | $R_N$ |
|---|---|---|---|---|
| TRACE (SINGLE SHOT) | COHERENT | COHERENT | COHERENT | RANDOM |
| CMP A | COHERENT | RANDOM | RANDOM | RANDOM |
| CMP B | RANDOM | COHERENT | RANDOM | RANDOM |

FIG 14

METHOD AND SYSTEM FOR ACQUIRING MARINE SEISMIC DATA USING MULTIPLE SEISMIC SOURCES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of seismic exploration. More particularly, the invention relates to methods for acquiring marine seismic data using selected arrangements of sources and receivers.

2. Background Art

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in the ocean, one or more air guns or water guns.

Seismic energy which emanates from the source travels through the earth formations until it reaches an acoustic impedance boundary in the formations. Acoustic impedance boundaries typically occur where the composition and/or mechanical properties of the earth formation change. Such boundaries are typically referred to as "bed boundaries". At an acoustic impedance boundary, some of the seismic energy is reflected back toward the earth's surface, where it may be detected by one or more of the seismic sensors deployed on the surface. Other portions of the energy are refracted and continue propagating in a generally downward direction until another impedance boundary is reached. Seismic signal processing known in the art has as an objective the determination of the depths and geographic locations of bed boundaries below the earth's surface. The depth and location of the bed boundaries is inferred from the travel time of the seismic energy to the acoustic impedance boundaries and back to the sensors at the surface.

Seismic surveying (marine seismic surveying) is performed in the ocean to determine the structure of earth formations below the sea bed. Marine seismic surveying known in the art includes having a vessel tow one or more seismic energy sources, and the same or a different vessel tow one or more "streamers", which are arrays of seismic sensors forming part of or otherwise affixed to a cable. Typically, a seismic vessel will tow a plurality of such streamers arranged to be separated by a selected lateral distance from each other, in a pattern selected to enable relatively complete determination of geologic structures in three dimensions.

The signals detected by the seismic sensors at the earth's surface include components of seismic energy reflected at the bed boundaries, as previously explained. In addition, both coherent noise (noise which has a determinable pattern, such as may be caused by a ship propeller) and incoherent (random) noise may be present. The presence of such noise in the signals received by the seismic sensors reduces the signal-to-noise ratio ("SNR") of the seismic signals of interest. An objective of seismologists, therefore, is to seek methods of eliminating the effects of noise on the signals detected by the sensors without appreciably reducing the true seismic signal component of the detected signals.

Prior art methods which have been used to reduce the effects of noise and acquire a higher quality seismic representation of a particular subsurface structure include using multiple actuations of the seismic source (multiple "firings" or "shots") to record a plurality of sensor measurements from substantially the same subsurface structure, and then summing or "stacking" such measurements to enhance signal strength while substantially reducing the effects of random or incoherent noise.

U.S. Pat. No. 5,818,795, which is assigned to the assignee of the present invention provides a detailed summary of prior art methods and systems addressing the problem of noise elimination in seismic signals, and discloses a method of reducing the effect of "burst" noise in seismic signal recordings without eliminating actual reflection data.

U.S. Pat. No. 5,761,152, which is assigned to the assignee of the present invention describes a method and system for marine seismic surveying. The method disclosed in the '152 patent includes increasing the fold (number of recorded reflections from a same reflector), and hence the signal-to-noise ratio of seismic signals, without incurring the problems of drag, entanglement, complicated deck handling, and decreased signal-to-noise ratio associated with increased streamer length, increased number of streamers, and increased distance between streamers. Source and streamer "offsets", and time of firing of lead and trailing vessel sources in a time delay sequence are optimized to increase the fold while avoiding any influence by the seismic signals resulting from the source of one vessel on the seismic signals resulting from the source of the other vessel.

SUMMARY OF INVENTION

One aspect of the invention is a marine seismic acquisition system adapted to substantially remove the effects of noise from recorded seismic signals of interest. The system includes a seismic recording vessel adapted to tow a first seismic source and to tow at least one seismic sensor system. The system includes a seismic source vessel adapted to track the seismic recording vessel and to tow a second seismic source at a selected distance from the first source. The system includes a controller adapted to fire the first source, wait a selected time, and to fire the second source in predetermined firing sequences. The selected time between the firing of first source and the second source in each firing sequence varies from firing sequence to firing sequence. The firing times of the first and second source are indexed so as to enable separate identification of seismic events originating from the first source and seismic events originating from the second source in detected seismic signals.

In some embodiments, the selected time may be varied by about 100 milliseconds or more between firing sequences. In other embodiments, the selected time may be varied in one of a systematic manner, a quasi-random manner, and a random manner. In some embodiments, the selected time is selected to be at least as long as a wavelet time of the first source.

Another aspect of the invention is a method for seismic surveying. The method includes towing a first seismic energy source and at least one seismic sensor system. A second seismic energy source is towed at a selected distance from the first seismic energy source. The first seismic energy source and the second seismic energy source are sequentially actuated in a plurality of firing sequences. A time interval between firing the first source and the second source is varied between successive ones of the firing sequences. The firing times of the first and second source are indexed so as to enable separate identification of seismic events originating from the first source and seismic events originating from the second source in detected seismic signals.

Another aspect of the invention is a method for determining signal components attributable to a first seismic energy source and to a second seismic energy source in signals recorded from a seismic sensor array. The first source and then the second source are fired in a plurality of firing sequences. A delay between firing the first source and the second source in each firing sequence selected to be different than the corresponding delays in other firing sequences. The method according to this aspect comprises determining a first component of the recorded signals that is coherent from shot to shot and from trace to trace, then time aligning the recordings with respect to the firing time of the second source, and determining a second component of the signals that is coherent from shot to shot and from trace to trace. In some embodiments, determining the first shot to shot coherent component includes generating a common mid point gather with respect to the first source. In some embodiments, determining the second shot to shot coherent component includes generating a common mid point gather with respect to the second source.

Other aspects and advantages of the invention will be apparent from the following description and the appended claims.

BRIEF DESCRIPTION OF DRAWINGS

FIG. 14 is a table showing coherent and random components of various types of trace gathers used in embodiments of the invention in order to identify a source to which various signals may be attributable.

DETAILED DESCRIPTION

The invention relates generally to methods and systems for acquiring marine seismic data which use more than one seismic energy source or source array disposed at spaced apart locations along or parallel to a survey line. Using spaced apart sources or source arrays enables increasing the effective subsurface coverage of a "line", "string" or array of seismic receivers (sensors) with respect to what may be possible using only a single source or source array. The invention is also related to methods and systems for identifying which one of the seismic sources caused particular events in signals detected by the seismic sensors. Identifying which seismic source caused the particular events is important for determining subsurface structures from the seismic signals, and may be used to reduce the effects of coherent and random noise in the recorded seismic signals.

In the description below, the term "seismic source" is used to describe a set of seismic energy sources such as air guns and water guns which are fired substantially simultaneously. Such a seismic source will normally include several air- or water guns, but might also consist of only one such gun. A seismic vessel will typically tow one, two or more seismic sources which are fired at separate times. In the following description two sources is used. It should be clearly understood, however, that a method and system according to the invention can use single sources or more than two sources on each vessel. Also, it is not necessary that all vessels operating together, tow the same number of sources.

Figure 1:
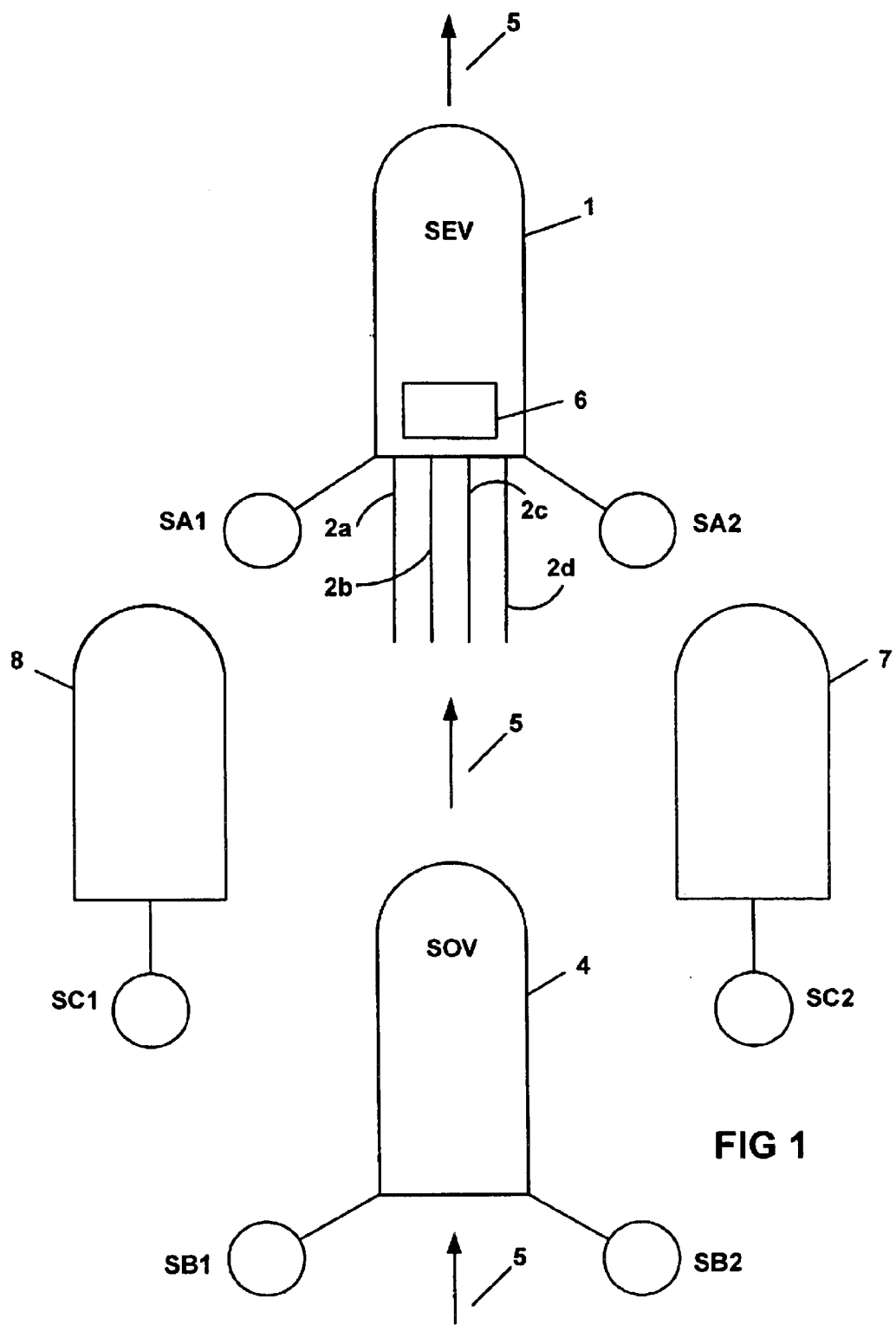
FIG. 1 is a diagram of one embodiment of a marine seismic acquisition system according to the invention.

FIG. 1 shows an example of a marine seismic data acquisition arrangement which may be used with the invention. A seismic vessel (SEV) 1 tows the first seismic sources SA1, SA2, and one or more "streamers" or seismic sensor arrays as shown at 2a–2d.

Each streamer 2a–2d includes a plurality of seismic sensors (typically hydrophones) disposed thereon at spaced apart locations along each streamer 2a–2d. The streamers 2a–2d are disposed along lines substantially parallel to the survey line 5. For purposes of the invention, only one streamer need be towed by the SEV 1, however, having a plurality of streamers as shown in FIG. 1 improves the efficiency and speed of data acquisition, as is known in the art. Sensors (not shown) in the streamers 2a–2d are operatively coupled to a recording system disposed on the SEV 1.

A source vessel (SOV) 4 trails the SEV 1 along the survey line 5. The SOV 4 tows the second seismic sources SB1–SB2 The second sources SB1, SB2 are towed at a selected distance from the first sources SA1, SA2.

The seismic recording system 6 may also include navigation equipment (not shown separately) to enable precisely determining the position of the vessels 1, 4 and the individual sensors (not shown separately) as seismic signals are recorded. The seismic recording system 6 may also include a source controller which selectively controls actuation of the one or more sources towed by the SEV 1 and by the SOV 4. Timing of source actuation by the source controller (not shown separately) will be further explained.

Each of the seismic sources SA1, SA2, SB1, SB2 in this embodiment, as previously explained, will typically include an array of air guns. Such arrays are used, for among other reasons as is known in the art, to provide "whiter" seismic energy (including a broader range of frequencies and having a more nearly constant amplitude for such frequencies). FIG. 1 also shows the second sources SB1–SB2 towed by the SOV 4 behind the seismic vessel 1. The second seismic sources may alternatively be towed in front of the SEV 1 at a selected distance. In other embodiments, the seismic acquisition system may include additional source vessels, shown generally at 7 and 8 in FIG. 1. These additional source vessels 7, 8 may each tow one or more additional seismic sources, shown generally at SC1 and SC2.

The first SA1, SA2 and second SB1, SB2 seismic energy sources are used in marine seismic surveying to increase the coverage area of the seismic data recorded by the recording system 6. Typically, each of the sources SA1, SA2, SB2, SB2 will be actuated in a sequence which reduces interference in the recorded signals. For purposes of the description which follows of methods according to the invention, a "first source" can be either one of the sources towed by the SEV 1, these being sources SA1 and SA2. A "second source"

referred to in the description can be either one of the sources towed by the SOV 4, these sources being SB1 and SB2.

It should also be understood that for purposes of defining the scope of the invention, it is not necessary to have a separate source vessel, or source vessels, to tow the second source (or any additional sources) as shown in FIG. 1, although having such a separate source vessel provides practical benefits such as increasing the effective subsurface coverage of the streamers 2a–2d, as is known in the art. For purposes of defining the scope of this invention, it is only necessary to have two seismic energy sources, where the second seismic energy source (or source array) is towed along (or parallel to) a survey line, such as 5 in FIG. 1, at a selected distance from the first seismic source (or source array).

During acquisition of seismic signals, the first sources SA1, SA2 and the second sources SB1, SB2 are sequentially fired in a plurality of firing sequences, the timing of which will be further explained, and signals detected by the sensors (not shown) on the streamers 2a–2d are recorded by the recording system 6.

Figure 2:
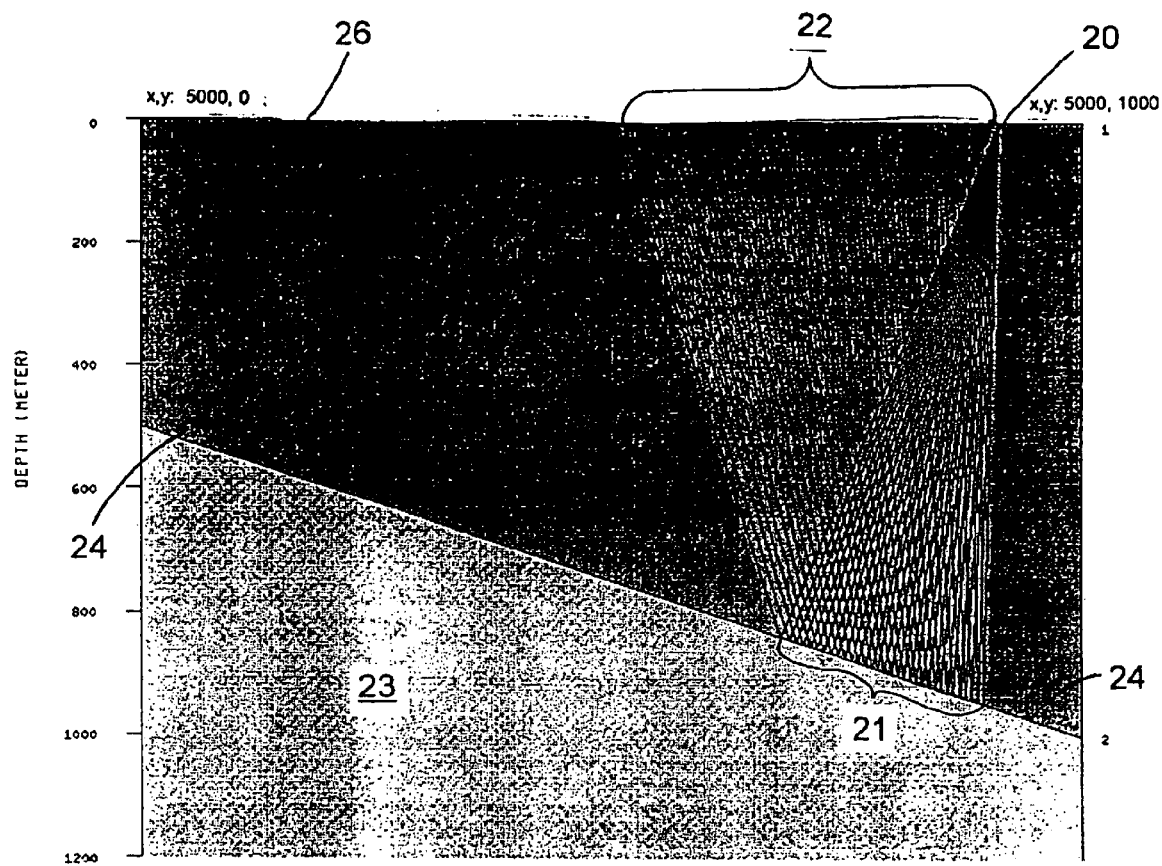
FIG. 2 shows an example of seismic energy paths (ray paths) from a source to a plurality of seismic receivers towed by a vessel as the seismic energy reflects from an acoustic impedance boundary.

FIG. 2 shows an example of paths 21 ("ray paths") of seismic energy as it travels from the first sources or source arrays (SA1–SA2 in FIG. 1), the location along the survey line (5 in FIG. 1) of which is shown at 20, downward through the water 26, to a subsurface acoustic impedance boundary (bed boundary) 24. Some of the seismic energy is reflected from the bed boundary 24 and travels upwardly through the water 26 where it is detected by the sensors on each of the streamers (2a–2d in FIG. 1), the locations of some of which are shown at 22. The ray paths 21 shown in FIG. 2 correspond to the path traveled by the seismic energy to each tenth sensor in one of the streamers (2a–2d in FIG. 1), recordings of which will be shown and explained below with reference to FIGS. 4–13.

Figure 3:
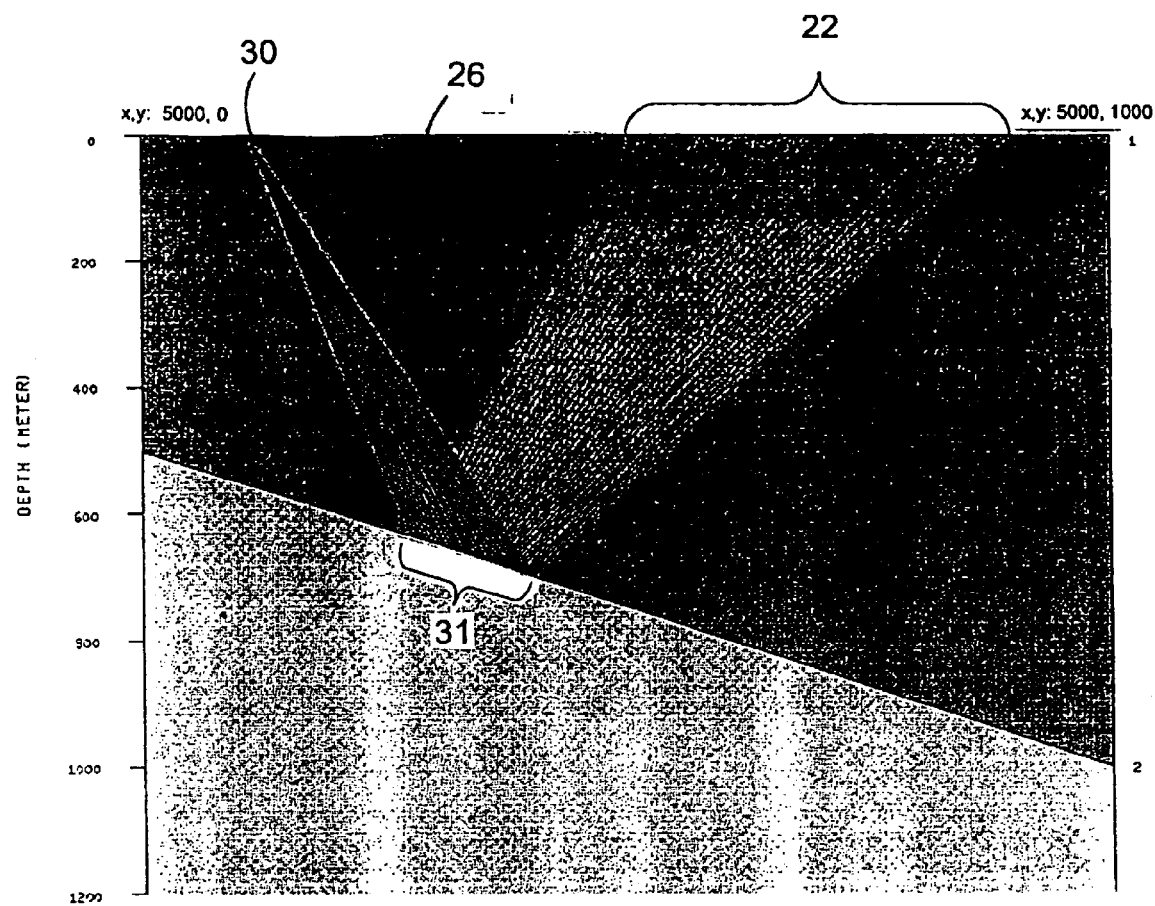
FIG. 3 shows an example of seismic ray paths for seismic energy from a source towed by a source vessel to the seismic receivers towed by the seismic recording vessel in FIG. 1.

FIG. 3 shows ray paths 31 for acoustic energy traveling from the second sources (SB1–SB2 as shown in FIG. 1), the position of which is shown at 30 in FIG. 3. The sensor positions 22 are substantially the same as those shown in FIG. 2, because the second source (or array) is actuated at a time delay with respect to actuation of the first source (or array) such that the seismic and source vessels, and thus the towed sources and receivers, move only a very small distance along the water 26 during the delay time. In FIG. 3, the position of the second source 30 with respect to the streamers and first source is typically selected such that the ray paths from 31 from the second source have different reflection locations along the boundary 24 than do the ray paths from the first source, such as shown in FIG. 2.

Prior art methods for using two or more spaced apart sources in an arrangement such as shown in FIG. 1 include firing the first source, and waiting before firing the second source a sufficient amount of time such that signals detected by the sensors resulting from firing the first source have substantially attenuated. In methods according to the invention, the second source is fired after a relatively small selected delay time after firing the first source, such that signals from the first source that have substantial amplitude are still being detected by the sensors.

In a method according to one aspect of the invention, the first source is actuated or "fired". A recording is made of the signal detected by the sensors that is indexed to a known time reference with respect to time of firing the first source. The second source (or array) is then fired at a known, selected time delay after the firing of the first source, while signal recording continues. Firing the first source, waiting the predetermined delay and firing the second source thereafter is referred to herein as a "firing sequence." This firing sequence, and contemporaneous signal recording, are repeated in a second firing sequence. The second firing sequence includes firing the first source, waiting a different selected time delay and then firing the second source, while recording seismic signals. The known, selected time delay between firing the first source and firing the second source is different for each successive firing sequence. For purposes of the invention, seismic signals are recorded for a plurality of such firing sequences, typically three or more firing sequences, each having a different value of time delay.

Although the time delay varies from sequence to sequence, the time delay between firing the first source and the second source in each firing sequence is preferably selected to be at least as long as the "wavelet" time of the seismic energy generated by the first source to avoid interference between the first and second sources. Typically, however, the time delay is less than one second, but in some cases may be several seconds. In some embodiments, the time delay between successive firing sequences may vary in a known, but random manner. In other embodiments, the time delay may vary in a known, but quasi-random manner. In still other embodiments, the time delay may be varied systematically. Examples of seismic signals as will be explained below with reference to FIGS. 4–13 may include a time delay variation between successive firing sequences of about 100 milliseconds.

Firing the first source and the second source in a plurality of firing sequences as described above, each having a different time delay, enables separating true seismic signals which result from the first source and from the second source as will be explained below with respect to FIGS. 4–14. Various methods of separating the seismic signals may also substantially attenuate coherent noise and random noise, as will be further explained.

Figure 4:
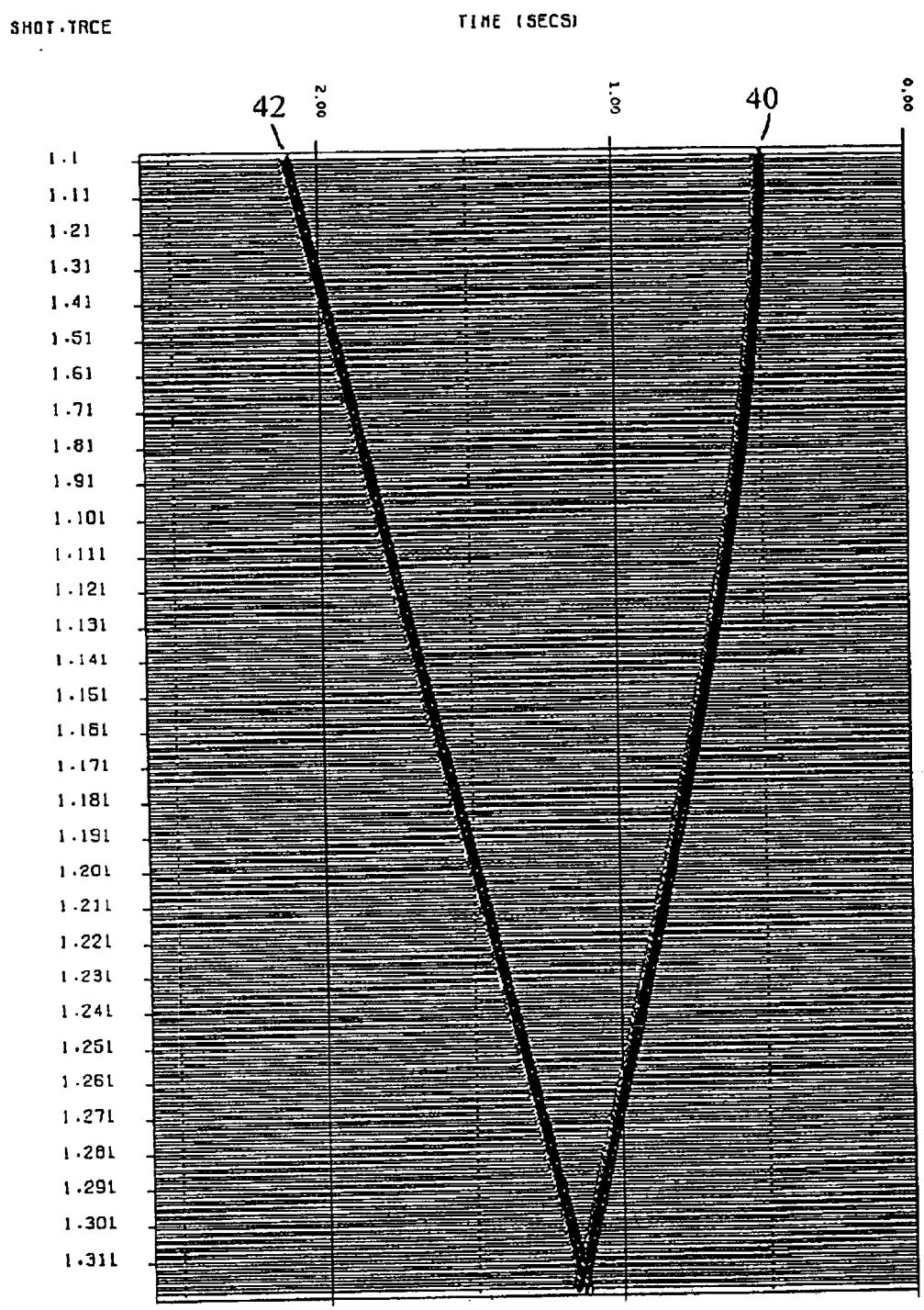
FIGS. 4 through 13 show example recordings of individual receiver signals from the example "shots" shown in FIGS. 2 and 3 in order to explain a method according to one aspect of the invention.

FIG. 4 shows a graphic display of amplitude with respect to time since source actuation of the signals as would be detected by each of the sensors in one of the streamers (2a–2d in FIG. 1) towed by the seismic vessel (1 in FIG. 1). The signals shown in FIG. 4 were synthesized for an example earth model such as the one shown in FIGS. 2 and 3. The display in FIG. 4 shows signals resulting from a single firing of the first source, followed by a single firing of the second source after a selected time delay. The display in FIG. 4 is arranged such that the signal from the sensor towed closest to the seismic vessel is on the left hand side of the display. The sensor signal displays or "traces" displayed from left to right in FIG. 4 represent the individual sensor signals from successively more distant ones of the sensors. Reflected seismic energy originating from the first source (or array, the position of which is shown at 20 in FIG. 2) appears as a high amplitude event that may be correlated in each successive trace, as shown at 40. Signals from the second source (or array, the position of which is shown at 30 in FIG. 3) that correspond to reflected energy from the same subsurface boundary (shown at 24 in FIGS. 2 and 3) can be identified by another event shown at 42. As would be expected, the event 40 resulting from the first source shows increased arrival time with respect to individual sensor distance from the first source in a well known relationship called "moveout". Correspondingly, the signals from the second source show moveout for event 42 in the opposite direction because of the placement of the second source with respect to the streamers (2a–2d in FIG. 1).

The table in FIG. 4 shows, for each source, a time of firing of each source with respect to a time index for signal recording. For the sake of brevity of description that follows, the first source (or source array) will be referred to in corresponding tables in each Figure as "source A" and the second source (or source array) will be referred to as "source B." The time delay between firing source A and source B identified in FIG. 4 is 0.1 second (100 milliseconds).

Figure 5:
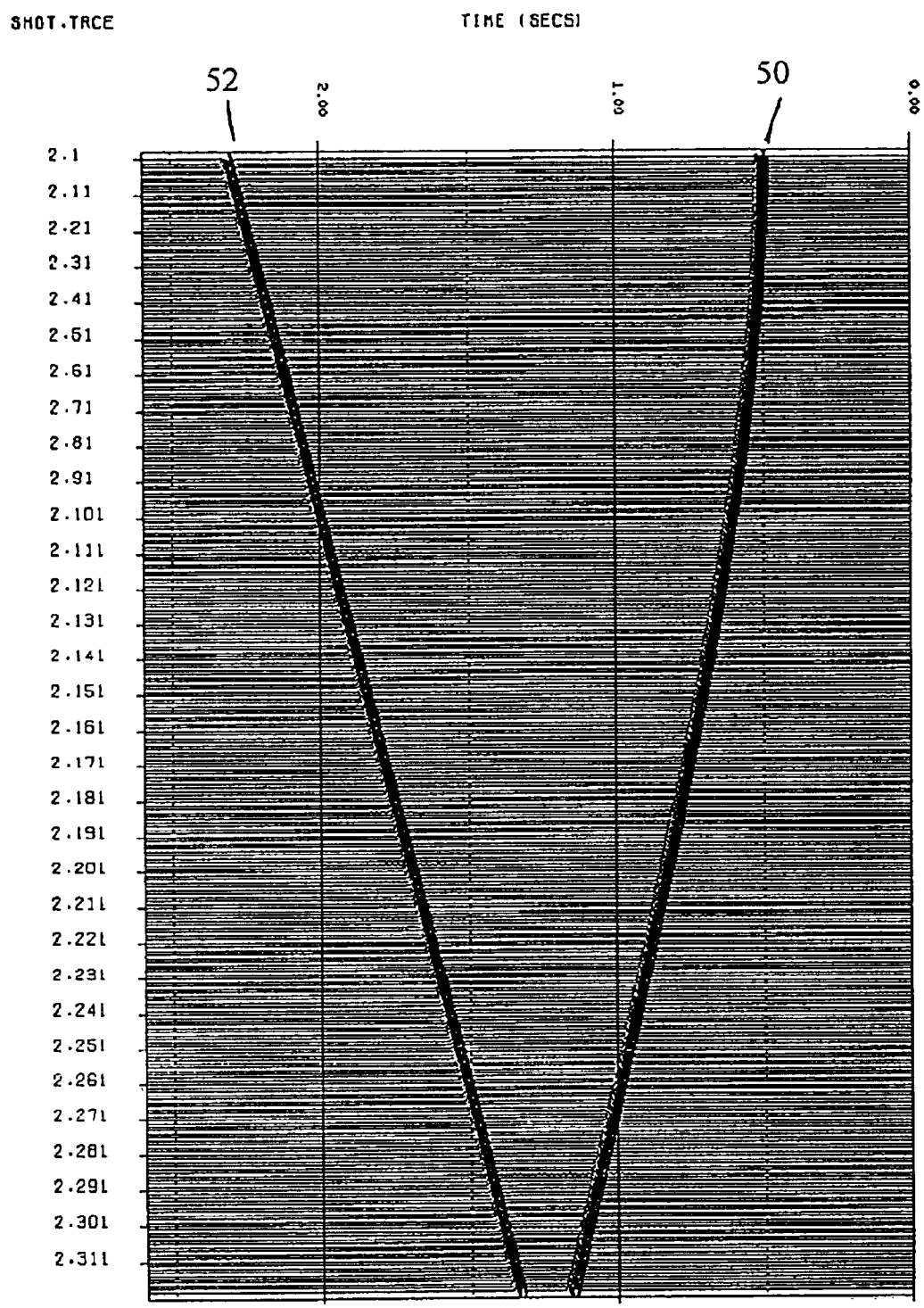

A display of synthesized signals resulting from a second firing sequence of sources A and B, for the earth model of FIGS. 2 and 3, is shown in FIG. 5. The firing sequence for which detected signals are shown in FIG. 5 is made at a selected time after recording the signals from the first firing (corresponding signals for which are shown in FIG. 4). This selected time depends on factors such as an approximate depth to which seismic analysis is desired to be performed, length of the streamers (2a–2d in FIG. 1), as is well known in the art, and typically is in a range of about 8 to 20 seconds. Arrival of reflective events corresponding to the events shown at 40 and 42 in FIG. 4 is shown for source A at 50 in FIG. 5 and for source B at 52. As shown in the table in FIG. 5, the selected time delay between firing source A and source B is 0.3 seconds.

Figure 6:
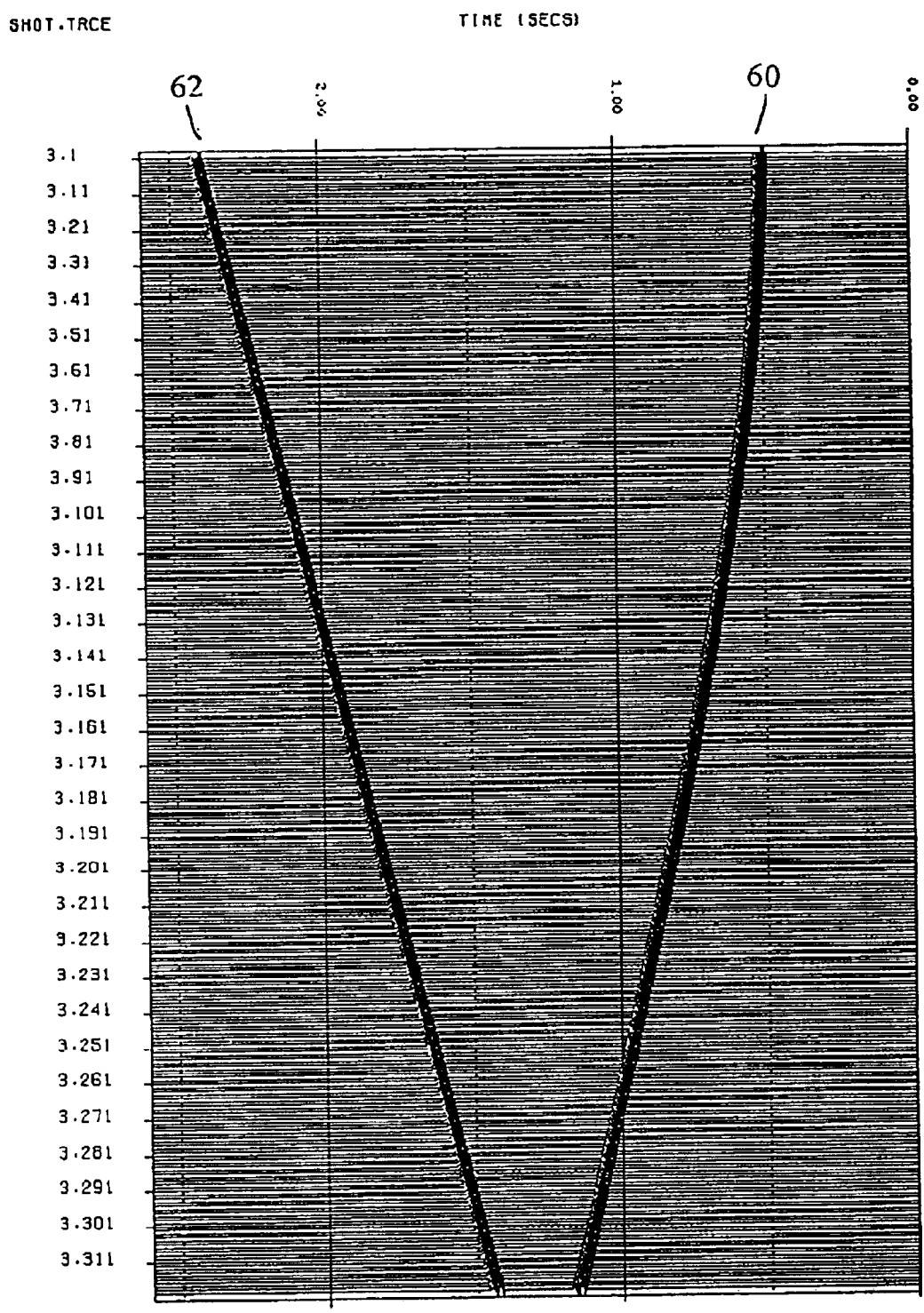

FIG. 6 shows a display similar to the ones shown in FIGS. 4 and 5, with corresponding reflective events for source A shown at 60 and for source B and 62. The display in FIG. 6 represents signals for a third firing sequences of the sources. And wherein the time delay between firing source A and source B is 0.4 seconds.

Figure 7:
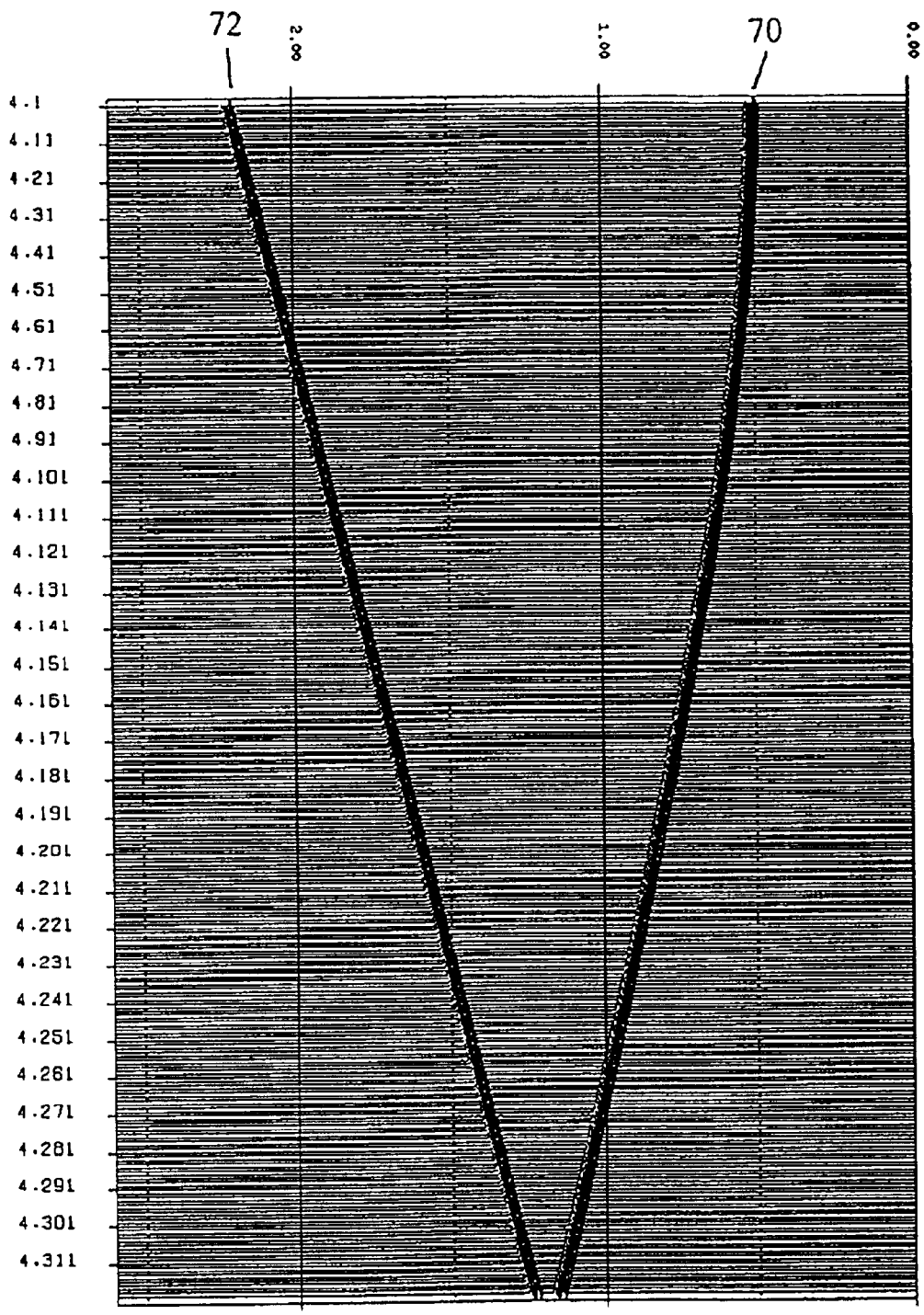

FIG. 7 shows a display of signals for a fourth firing sequence of source A and source B, wherein the selected time delay between firing source A and source B is 0.2 seconds. Corresponding reflective events 70 and 72 are shown for source A signals and source B signals, respectively.

Figure 8:
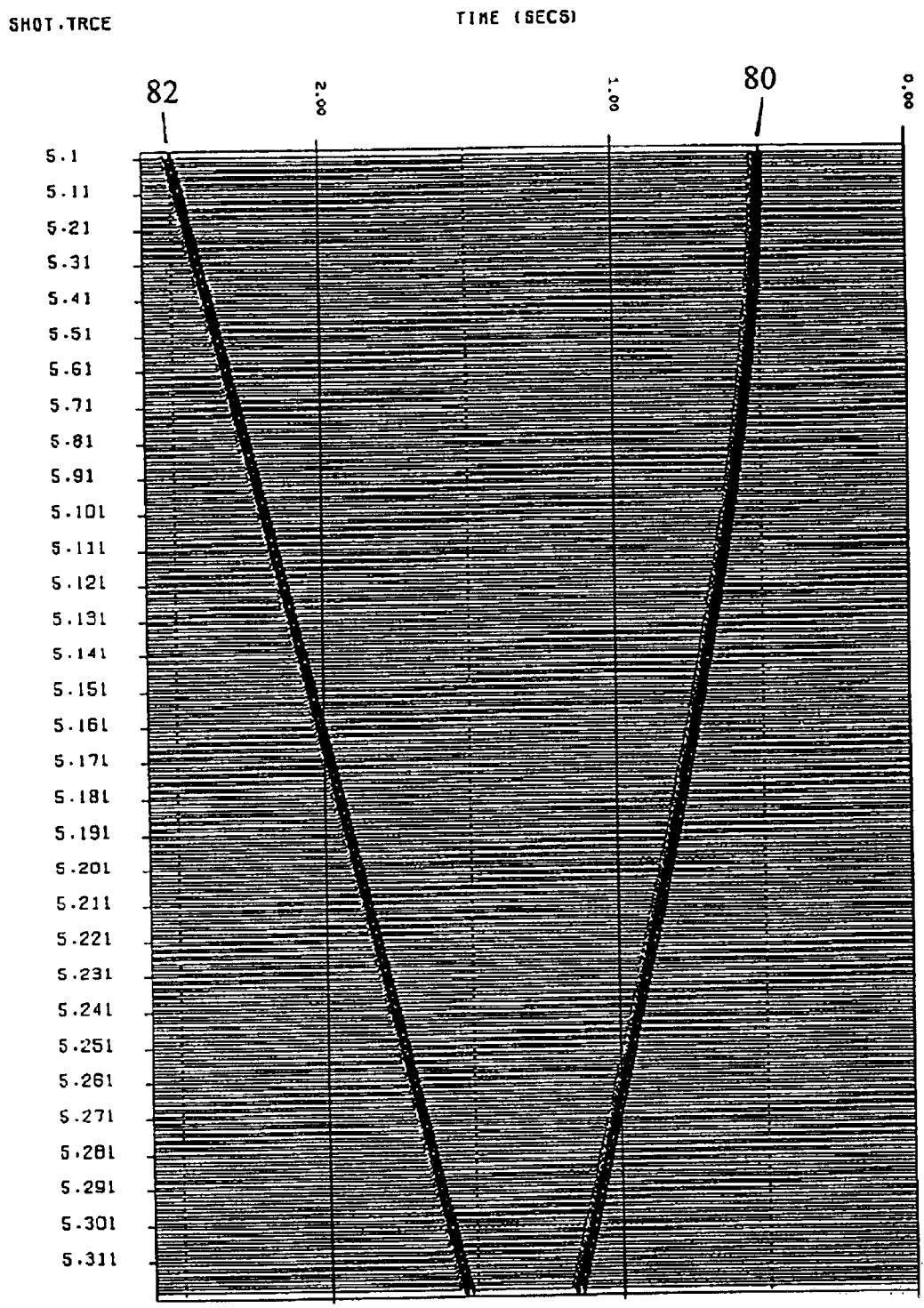

FIG. 8 shows a display of signals for a fifth firing sequence of source A and source B, wherein the selected time delay is 0.5 seconds. Corresponding reflective events 80 and 82 are shown for source A signals and source B signals, respectively.

Reflective events corresponding to signals from source A, shown at 40, 50, 60, 70 and 80, respectively, in FIGS. 4 through 8, occur at very similar times with respect to the time of firing of source A. Differences in arrival time between traces for each such event corresponding to source A may depend on the actual position of the seismic vessel (1 in FIG. 1) at the time of each source A firing, which position depends on vessel speed and time between firing sequences. The arrival time of the source A events may also depend on the subsurface structure of the earth, among other factors. Nonetheless, there is a very high degree of correspondence between the source A reflective events 40, 50, 60, 70, 80, respectively, in FIGS. 4 through 8.

In some embodiments of a method according to the invention, a "true" seismic signal component corresponding to the firing of source A can be identified in the traces by a two part procedure. The first part includes determining coherence between the traces within an individual firing sequence. This part can be performed by selecting closely spaced subsets of all the traces (such as a subset of between five and ten traces) such as shown in FIGS. 4 through 8, and determining coherence between the selected traces within selected-length time windows. Coherence may be determined, for each subset of traces selected, by correlating the traces to each other over the selected-length time windows. A result of the correlation is a curve or trace the amplitude of which represents degree of correspondence from trace to trace with respect to time.

The coherence between traces determined in the first part of the procedure includes components that are also coherent between firing sequences with respect to the firing time of source A. These components represent the "true" signal corresponding to actuating source A. The trace correspondence determined in the first part of the method also includes coherent noise, such as would result from signals caused by actuation of source B, shown as events 42, 52, 62, 72 and 82, respectively in FIGS. 4 through 8, or other coherent noise such as from a ship propeller. Random noise is substantially not present in the correspondence traces because random noise has substantially no correspondence from trace to trace. The second part of the method includes separating the components of the signals which are caused by source A from the coherent noise. In one embodiment, separation of the source A component can be performed by generating trace to trace coherence measures (traces), as just described, for each of a plurality of firing sequences. Corresponding ones of the coherence traces are then correlated to each other between firing sequences, to generate coherence traces from shot to shot. The resulting coherence traces will substantially represent seismic signals resulting only from source A. Coherent noise from source B and other coherent sources will be substantially absent from the shot to shot coherence traces.

The reason the source B "noise" is substantially removed by the shot to shot coherence determination can be explained as follows. As can be observed in FIGS. 4 through 8, the arrival time of successive source B events 42, 52, 62, 72, 82, respectively, is very similar between individual traces, and so would show a high trace to trace coherence. Difference in coherence in the source B events is substantially between firing sequences (when time is indexed with respect to the firing time of source A). This difference in coherence in the source B events is primarily because of the different time delay between firing source A and source B in each firing sequence. Therefore, while the events 42, 52, 62, 72, 82 may show high coherence from trace to trace, they substantially will not have coherence from shot to shot when the recording time is indexed to source A. Coherent noise, such as from a ship propeller, would show similar trace to trace coherence but relatively little shot to shot coherence In one embodiment, determining shot to shot coherence to identify the source A originating signals may be performed by generating a common-midpoint (CMP) trace gather with respect to source A. A CMP gather with respect to source A comprises a subset of all the traces (signal recordings) corresponding to each of a plurality of source A firings, in which the position of source A, and the corresponding sensor for which the trace is presented or processed in the gather, have the same "midpoint" between them. CMP gathers with respect to source A will have a high coherence for events which correspond to firing of source A. CMP gathers with respect to source A, by contrast, will have very low coherence for source B originating signals, for coherent noise and for random noise.

Figure 9:
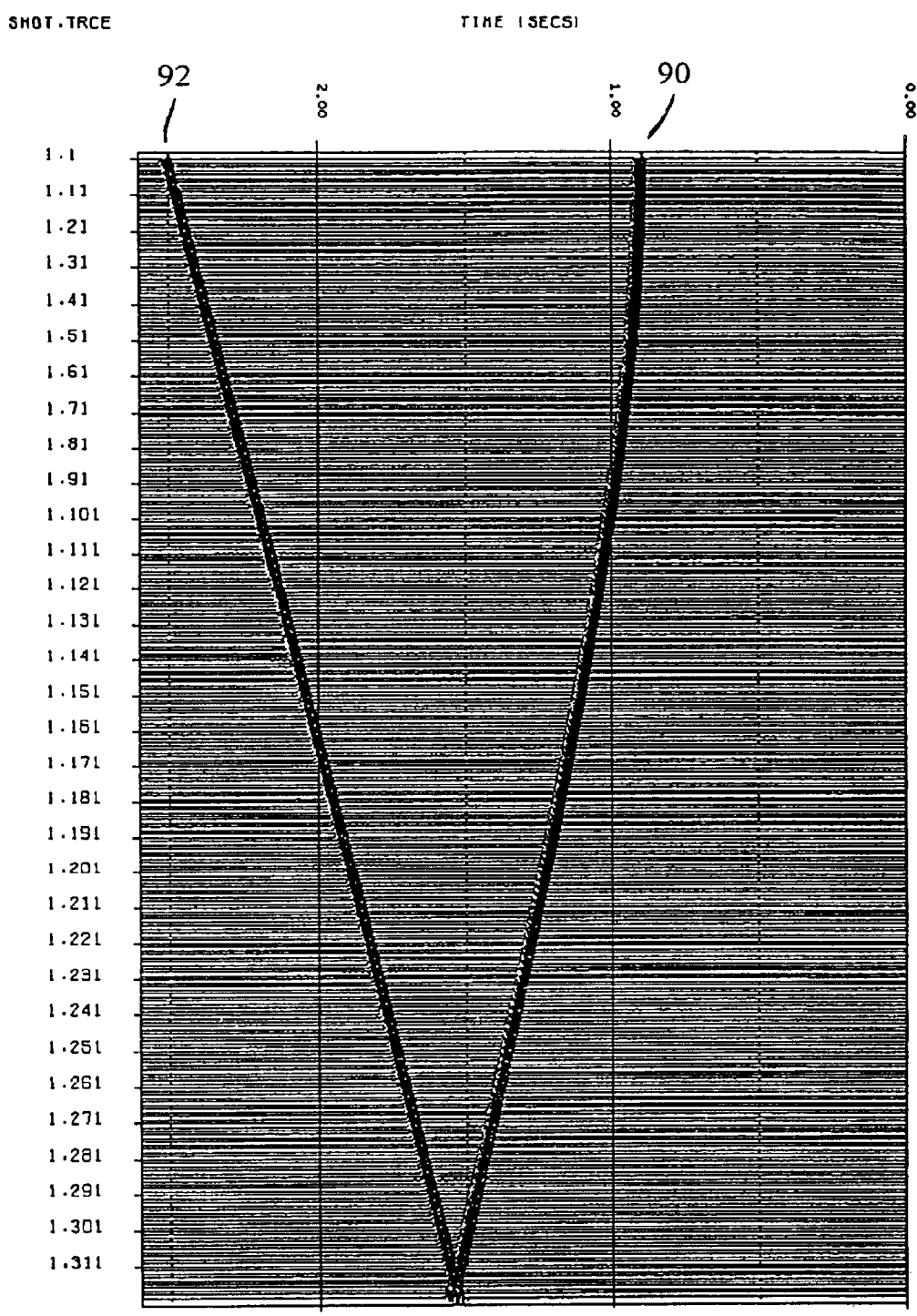
Figure 10:
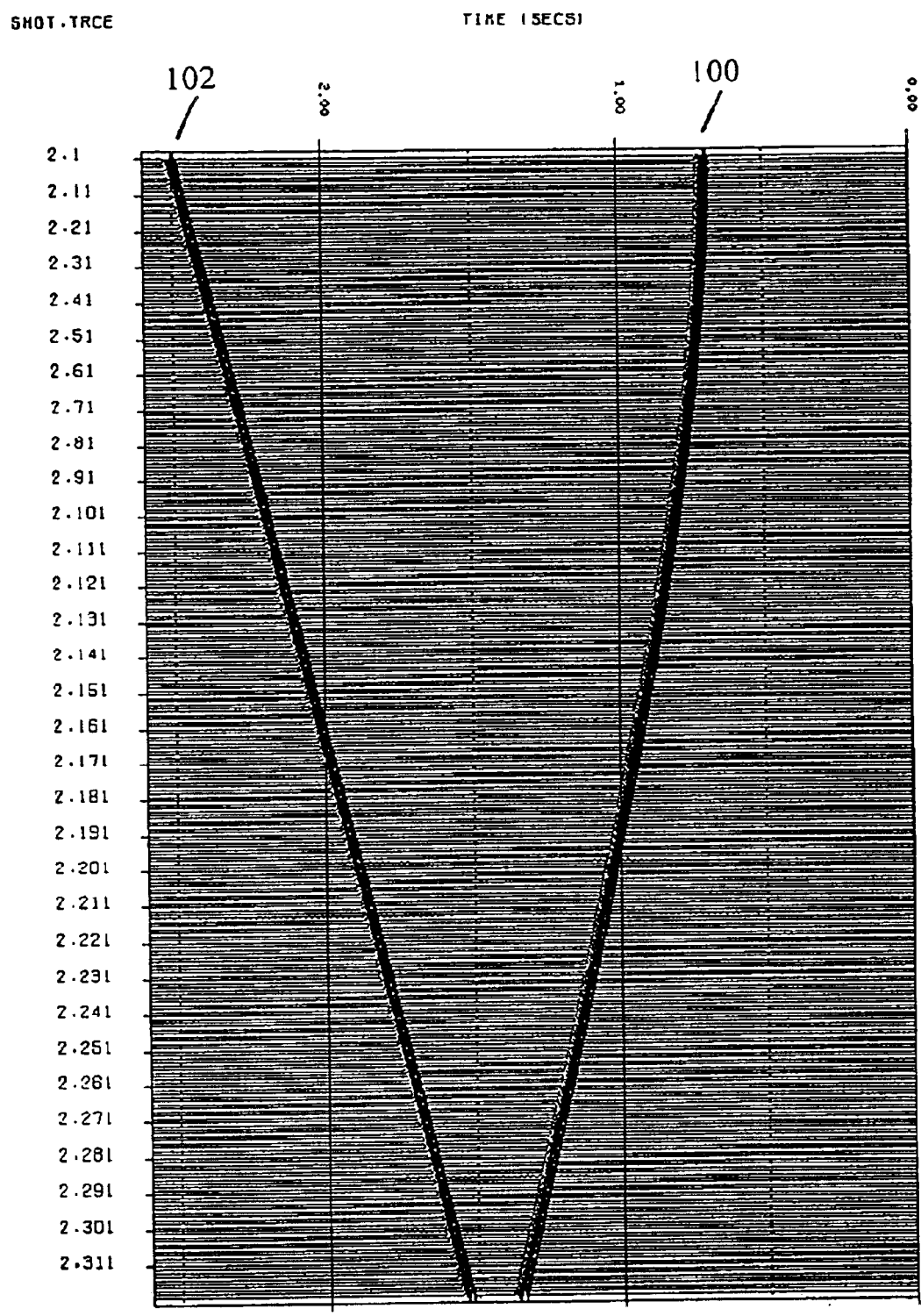
Figure 11:
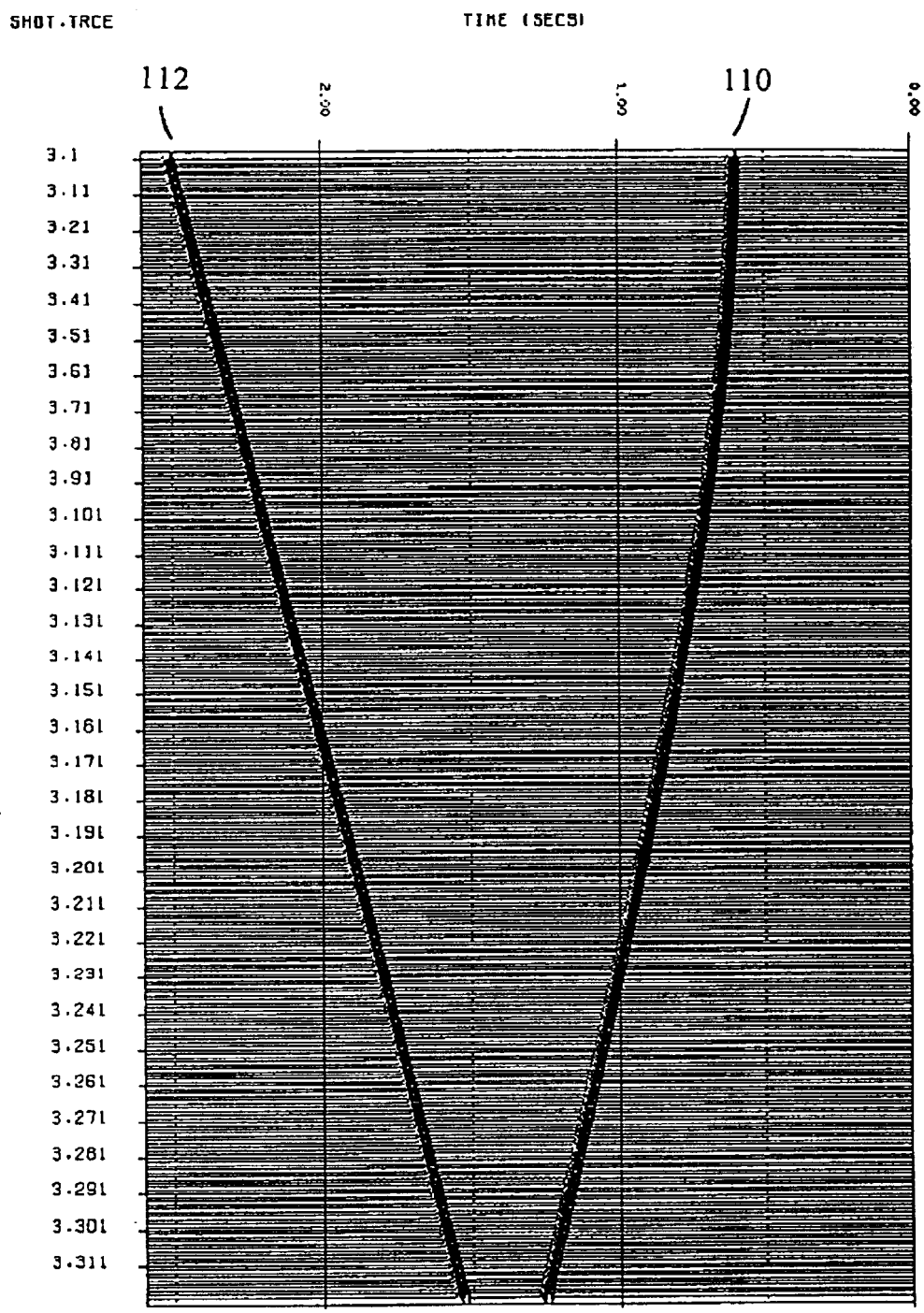
Figure 12:
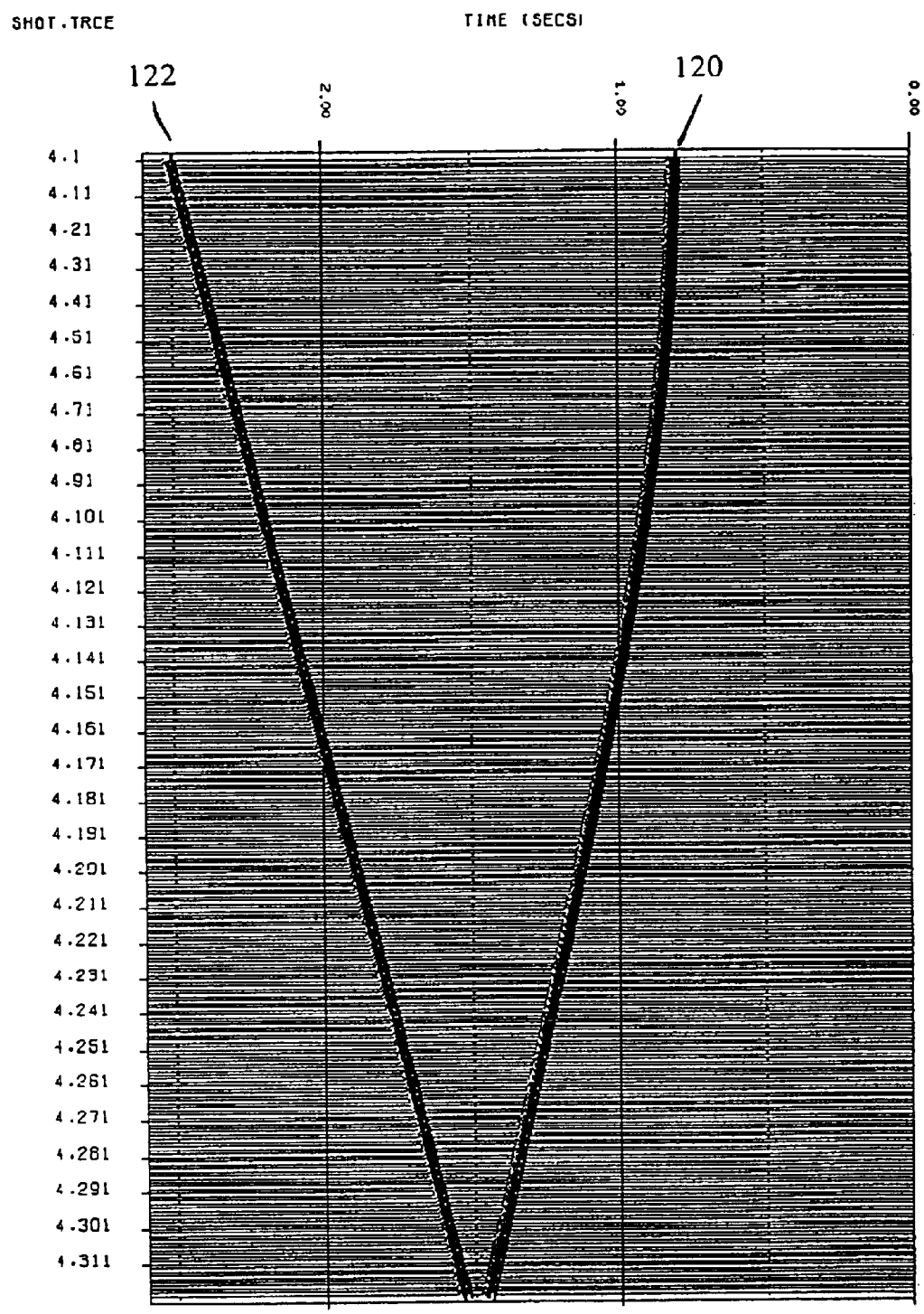
Figure 13:
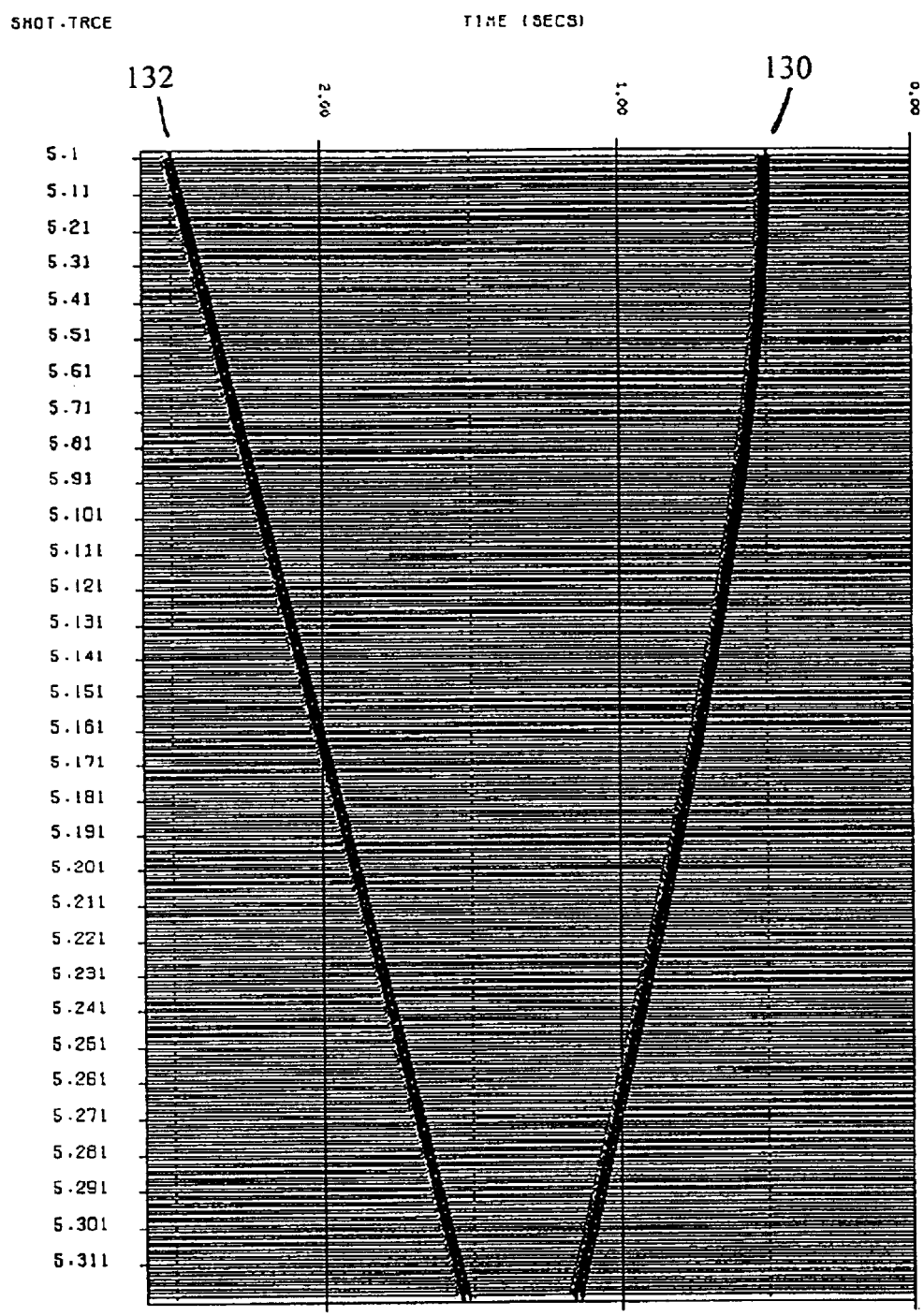

Having thus identified the "true" seismic signals originating from the first source (source A), one embodiment of a method according to the invention further includes identifying the "true" seismic signals originating from the second source (source B). This can be performed by time-aligning the signals from each firing sequence with respect to the firing time of source B. In some embodiments, this can be performed by applying a time delay to each trace such that the signals from source B all represent a same time delay from the start of signal recording or from a selected time index related to the time of firing of source B. FIG. 9 shows trace display of the same signals shown in FIG. 4, but with the addition of a time delay of 0.4 seconds, as shown in the table in FIG. 9. FIG. 10 shows the same signal traces as shown in FIG. 5, but with the addition of a time delay of 0.2 seconds. Similarly, FIGS. 11 trough 13 show traces which correspond to traces shown in FIGS. 6 through 8, but with time delays of 0.1, 0.3 and 0.0 seconds, respectively. Corresponding reflective events for the source A and source B signals are shown in FIGS. 9 through 13 and 90 and 92, 100 and 102, 110 and 112, 120 and 122 and 130 and 132, respectively.

In FIGS. 9 through 13, the signals resulting from actuating the second source (source B) in each firing sequence now each have a time delay from start of recording (in this case the firing of source A as a time reference) of 0.5 seconds, and as a result are substantially time-aligned. True seismic signal from the second source (source B) may then be identified by using trace-to-trace and shot-to-shot coherence determination, just as used to determine first source true seismic signals where the first source firings are time aligned from the start of recording, as previously explained with reference to FIGS. 4 through 8. Shot to shot coherence may be determined, in one embodiment, by generating CMP trace gathers with respect to source B. Events in the traces corresponding to source B will have high coherence in a CMP gather with respect to source B. Source A induced events, other coherent noise, and random noise will have very little coherence in a CMP gather with respect to source B.

In some embodiments, the accuracy with which the signal components corresponding to source A and to source B may be checked by determining an amount of energy in each set of coherence traces which corresponds to an energy source other than the one the coherence traces correspond to. Energy in the coherence traces which does not correspond to the signals being identified indicates that the correlations may need to be performed again, using, for example, different length time windows.

An explanation of this checking procedure will follow with reference to FIG. 14. In a seismic recording made as described above including source A and source B the total signal amplitude with respect to time, represented as S(t), is the sum of the first source "true" signals $S_A(t)$, the second source "true" signals $S_B(t)$, coherent noise $C_N(t)$ and random noise $R_N(t)$ as shown in the following expression.

$$S(t)=S_A(t)+S_B(t)+C_N(t)+R_N(t) \quad (1)$$

By determining estimates of the signal which correspond only to the true signals originating at source A, $S_A(t)$, and source B, $S_B(t)$, determining aspects of the coherent noise and random noise then becomes unnecessary. FIG. 14 shows a table indicating which components in the recorded seismic signals have coherence in each of three "domains." The first such domain is trace to trace within a single firing sequence or "shot." Signals from the first source (source A) and from the second source (source B), as well as coherent noise, will have coherence from trace to trace. Random noise will not have any coherence in the trace to trace domain. A CMP gather with respect to source A will have coherence only for signals resulting from source A. Source B signals, coherent noise and random noise will have substantially no coherence (be random). A CMP gather with respect to source B will show coherence for signals originating from source B. Source A signals, coherent noise and random noise will have substantially no coherence in a source B CMP gather. In one embodiment, the signals identified to source A may be removed from the total signal. Then, the source A identified signals can be time aligned with respect to the firing time of source B, gathered in a CMP gather with respect to source B and checked to see if there is any coherence. As shown in FIG. 14, source A signals should be random (have substantially zero energy) in a CMP gather with respect to source B. Correspondingly, the signals identified to source B can be time aligned with respect to the firing time of source A, and CMP gathered with respect to source A. Source B signals should have substantially zero energy (be random) in a CMP gather with respect to source A, as indicated in the table of FIG. 14.

The signals corresponding to source A and source B may be removed from the originally recorded signals. Trace to trace correlation may show some energy if there is coherent noise in the remainder, as shown in FIG. 14. However, CMP gathers of the remainder with respect to either source A or source B should have substantially no energy (be random) as indicated in FIG. 14.

The foregoing embodiments of the invention are described in terms of having two seismic energy sources at spaced apart positions. However, the invention is not limited in scope to having only two sources and identifying two trace to trace and shot to shot components. In other embodiments, three or more sources may be used. In such embodiments, the third, and any additional sources, are each fired sequentially in each firing sequence. For example, the system shown in FIG. 1 includes six sources SA1, SA2, SB1, SB, SC1, SC2. A third source, which may be any of the remaining unfired source in the system of FIG. 1 is fired after a selected time delay after the second source is fired. The time delay between firing the second source and the third source is different than the delay between firing the first source and the second source. The delay between firing the second source and the third source is also different in each firing sequence. As in the previous embodiments, it is preferred that the time delay between source firings in any one sequence be at least as long as the wavelet time for the immediately prior source firing. The delay times may be random, quasi-random or systematically determined, as in previous embodiments, and only need to be known. In embodiments using three or more sources, determining coherent signal components identified to the third and any additional sources includes time aligning the recorded signals with respect to the source for which reflective events are desired to be identified, and determining trace to trace and shot to shot coherent components of the time-aligned signals. Determining the shot to shot coherent components may be performed, in some embodiments, by generating a common mid point gather with respect to the source for which signal components are to be identified.

Embodiments of a method according to the invention enable recording seismic surveys using a plurality of sources disposed at spaced apart positions such that the subsurface coverage of each sensor "streamer" is increased as compared with methods using only a single source. As compared with methods known in the art using multiple, spaced apart sources, methods according to the invention may provide the additional benefit of reducing a waiting time between firing the sources in firing sequences because signals from each of the plurality of sources may be uniquely identified in a shot sequence. Therefore, embodiments of a method according to the invention may increase the efficiency with which seismic surveying is performed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic surveying, comprising:
   towing a first seismic energy source and at least one seismic sensor system;
   towing a second seismic energy source at a selected distance from the first seismic energy source; and
   actuating the first seismic energy source and the second seismic energy source in a plurality of firing sequences, each of the firing sequences including firing of the first source and the second source and recording signals generated by the at least one seismic sensor system, a time interval between firing the first source and the second source varied between successive ones of the firing sequences, the times of firing the first and second source indexed so as to enable separate identification of seismic events originating from the first source and seismic events originating from the second source in detected seismic signals.

2. The method of claim 1, wherein the time interval is varied systematically.

3. The method of claim 1 wherein the time interval is varied quasi-randomly.

4. The method of claim 1, wherein the time interval varied is randomly.

5. The method of claim 1, wherein the time interval is varied in steps of about 100 milliseconds.

6. The method as defined in claim 1, wherein the time interval is at least as long as a wavelet time of the first source.

7. The method as defined in claim 1 further comprising actuating at least one additional seismic energy source in each tiring sequence, the at least one additional seismic energy source actuated after an additional selected time interval after firing the second source, the additional selected time interval different than the time interval between firing the first and second sources, the additional time interval varied between successive ones of the firing sequences.

8. The method as defined in claim 7 wherein the additional time interval is varied randomly between firing sequences.

9. The method as defined in claim 7 wherein the additional time interval is varied quasi-randomly between firing sequences.

10. The method as defined in claim 7 wherein the additional time interval is varied systematically between firing sequences.

11. The method as defined in claim 7 further comprising extracting from the recorded sensor signals coherent seismic signals identified to each of the first, second and at least one additional seismic energy sources.

12. The method as defined in claim 11 wherein the extracting the signals identified to the first source comprises determining trace to trace and shot to shot coherent components in the recorded sensor signals.

13. The method as defined in claim 12 wherein determining the shot to shot coherent component comprises generating a common mid point trace gather with respect to the first source.

14. The method as defined in claim 12 wherein the extracting the signals identified to each of the second and at least one additional seismic source comprises, for each of the second and at least one additional source, time aligning the signals with respect to a firing time of each of the second and at least one additional source, and determining trace to trace and shot to shot coherent components in the recorded sensor signals.

15. The method as defined in claim 14 wherein the determining the shot to shot coherent components comprises generating a common mid point trace gather with respect to each of the second and at least one additional sources.

16. The method as defined in claim 1 further comprising, extracting from the recorded sensor signals coherent seismic signals identified to each of the first seismic energy source and the second seismic energy source.

17. The method as defined in claim 16 wherein the extracting the signals identified to the first source comprises determining trace to trace and shot to shot coherent components in the recorded sensor signals.

18. The method as defined in claim 16 wherein the determining the shot to shot coherent components comprises generating a common mid point gather with respect to the first source.

19. The method as defined in claim 6 wherein the extracting the signals identified to the second source comprises time aligning the recorded signals with respect to firing the second source and determining trace to trace and shot to shot coherent components in the time-aligned recorded seismic signals.

20. The method as defined in claim 19 wherein the determining the shot to shot coherent components comprises generating a common mid point gather with respect to the second source.

21. The method as defined in claim 1 wherein the second source is towed behind the first source.

22. The method as defined in claim 1 wherein the first source and the at least one sensor system are towed by a first vessel and the second source is towed by a second vessel.

23. A seismic surveying system, comprising:
   a first seismic energy source;
   a second seismic energy source;
   at least one seismic sensor array;
   a vessel adapted to tow the first source, to tow the at least one seismic sensor array, and to tow the at least one second source at a selected distance from the first source; and
   a controller adapted to actuate the first source and the second source in a plurality of firing sequences, the sequences having a time delay between firing the first source and the second source which varies between successive firing sequences, the times interval of firing the first and second source indexed so as to enable separate identification of seismic events originating from the first source and seismic events originating from the second source in detected seismic signals.

24. The system of claim 23, wherein the controller is adapted to cause the time interval to be varied systematically.

25. The system of claim 23, wherein the controller is adapted to cause the time interval to be varied quasi-randomly.

26. The system of claim 23, wherein the controller is adapted to cause the time interval to be varied randomly.

27. The system of claim 23, wherein the controller is adapted to cause the time interval to be varied in steps of at least about 100 milliseconds.

28. The system of claim 23 wherein the controller is adapted to cause the time interval to be at least as long as a wavelet time of the first source.

29. The system of claim 23 further comprising a second vessel adapted to tow the second source at a selected distance from the first source.

30. The system of claim 23 further comprising at least one additional source spaced at a selected distance from the first source and the second source, the controller further adapted to actuate the at least one additional source after an additional time interval, the additional time interval different than a length of the time delay, the additional time interval different in each of the firing sequences.

31. A method for determining signal components attributable to a first seismic energy source and to a second seismic energy source in signals recorded from seismic sensors, the first and second sources and the sensors towed along a survey line, the first source and the second source fired in a plurality of sequences, a time delay between firing the first source and the second source in each firing sequence being different than the time delay in other ones of the firing sequences, the method comprising:

determining a first component of the recorded signals that is coherent from shot to shot and from trace to trace;

time aligning die recorded signals with respect to a firing time of the second source in each firing sequence; and determining a second component of the signals that is coherent from shot to shot and from trace to trace in the time aligned signals.

32. The method as defined in claim 31 wherein the delay between firing the first source and firing the second source is varied systematically between each firing sequence.

33. The method as defined in claim 31 wherein the delay between firing the first source and firing the second source is varied quasi randomly between each firing sequence.

34. The method as defined in claim 31 wherein the delay between firing the first source and firing the second source is varied randomly between each firing sequence.

35. The method as defined in claim 31 wherein the delay is at least as long as a wavelet time of the first source.

36. The method as defined in claim 31 wherein the determining the first component comprises performing a common mid point gather with respect to the first source of the recorded signals.

37. The method as defined in claim 31 wherein the determining the second component comprises performing a common mid point gather with respect to the second source of the time aligned signals.

38. The method as defined in claim 31 wherein the recorded seismic signals comprise components attributable to at least one additional seismic energy source fired after an additional time interval after the firing the second source in each firing sequence, the additional time interval being different in each sequence, the additional time interval being different from the time delay between firing the first and second source in each sequence, the method further comprising, time aligning the recorded signals with respect to a firing time of the at least one additional source, and determining trace to trace and shot to shot coherent components of the signals time aligned with respect to the firing time of the at least one additional source.

* * * * *